US006190133B1

(12) United States Patent
Ress, Jr. et al.

(10) Patent No.: US 6,190,133 B1
(45) Date of Patent: Feb. 20, 2001

(54) HIGH STIFFNESS AIROIL AND METHOD OF MANUFACTURE

(75) Inventors: Robert Anthony Ress, Jr., Carmel; Bruce Allan Ewing, Martinsville; Brian Paul King, Greenwood, all of IN (US)

(73) Assignees: Allison Engine Company; Allison Advanced Development Company, both of Indianapolis, IN (US)

(*) Notice: Under 35 U.S.C. 154(b), the term of this patent shall be extended for 0 days.

(21) Appl. No.: 09/134,392

(22) Filed: Aug. 14, 1998

(51) Int. Cl.[7] ....... F01D 5/14

(52) U.S. Cl. ....... 416/229 A; 416/230; 416/241 R; 416/223 A

(58) Field of Search ....... 416/229 R, 229 A, 416/230, 241 R, 242, 223 A, 241 B; 29/889.7, 889.71, 527.5

(56) References Cited

U.S. PATENT DOCUMENTS

| | | | | |
|---|---|---|---|---|
| 3,572,971 | * | 3/1971 | Seiwert | 416/230 |
| 3,667,108 | | 6/1972 | Schmidt | 29/480 |
| 3,699,623 | | 10/1972 | Kreider | 29/156.8 |
| 4,247,259 | | 1/1981 | Saboe et al. | 416/241 |
| 4,301,584 | * | 11/1981 | Dillner et al. | 29/156.8 |
| 4,314,007 | | 2/1982 | Gessinger | 428/614 |
| 4,772,450 | * | 9/1988 | Friedman | 416/241 R |
| 4,867,644 | | 9/1989 | Wright et al. | 416/230 |
| 4,904,546 | | 2/1990 | Jackson | 428/661 |
| 5,006,419 | | 4/1991 | Grunke et al. | 428/623 |
| 5,161,950 | * | 11/1992 | Krueger et al. | 416/204 R |
| 5,240,376 | | 8/1993 | Velicki | 416/229 |
| 5,384,959 | | 1/1995 | Velicki | 29/889.72 |
| 5,429,877 | | 7/1995 | Eylon | 428/586 |
| 5,451,472 | | 9/1995 | Gregg et al. | 428/593 |
| 5,484,665 | | 1/1996 | Singh et al. | 428/661 |
| 5,865,364 | * | 2/1999 | Trask et al. | 228/212 |
| 5,910,376 | * | 6/1999 | Kelly | 428/558 |
| 5,924,483 | * | 7/1999 | Frasier | 165/154 |

FOREIGN PATENT DOCUMENTS

| | | | |
|---|---|---|---|
| 0 747 155 A1 | 12/1996 | (EP) | B22F/7/08 |
| 0 750 957 A1 | 2/1997 | (EP) | B22C/9/04 |
| 0 559 251 B1 | 2/1998 | (EP) | B22C/9/04 |
| WO 99/44774 | 9/1999 | (WO) | B22F/7/04 |

* cited by examiner

*Primary Examiner*—F. Daniel Lopez
*Assistant Examiner*—James M. McAleenan
(74) *Attorney, Agent, or Firm*—Woodard, Emhardt, Naughton Moriarty & McNett

(57) ABSTRACT

A cast metallic airfoil structure having a high stiffness core positioned therein for increasing the stiffness of the airfoil. In one embodiment, the high stiffness core is preferably formed of gamma titanium aluminde or a titanium metal matrix composite and is metallurgically bonded to the cast metallic airfoil structure. In one form the airfoil structure forms a portion of an integrally bladed rotor, and in a second form the airfoil structure has a dove tail attachment portion.

42 Claims, 9 Drawing Sheets

29
22a 23 26 15 25 24 4 4 22 19 20 22b 21

22 X 32 24 27 22c 23 26 23a 22a 28 25 33

HIGH STIFFNESS AIROIL AND METHOD OF MANUFACTURE

BACKGROUND OF THE INVENTION

The present invention relates generally to gas turbine engine airfoils having properties including improved stiffness and high cycle fatigue capability. More particularly, in one embodiment the present invention defines a single cast metallic airfoil structure having a high stiffness core positioned therein and metallurgically bonded thereto. The high stiffness core is preferably formed of gamma titanium aluminde or a titanium metal matrix composite. Although the present invention was developed for use in a gas turbine engine, certain applications may be outside of this field.

Modern gas turbine engines often utilize fan blades, compressor blades and vanes, and may operate at high rotation speeds and high compression ratios. Consequently, the rotating engine components must be strong, stiff, light in weight and high temperature resistant. Conventional airfoils in the fan and forward stages of the gas turbine engine compressor are typically machined from a titanium alloy forging. A titanium alloy is used because of its high specific strength. The stiffness of an airfoil is a function of airfoil geometry and the material modulus of elasticity. Since all of the titanium alloys used in gas turbine engine airfoil applications possess a similar modulus of elasticity, changes in airfoil stiffness have generally been accomplished by changes in geometry. In some instances, aerodynamic performance is compromised as a result of altering airfoil geometry in order to meet dynamic and high cycle fatigue requirements.

A conventional method to stiffen hollow titanium structures, such as fan blades, compressor blades and vanes include placing internal stiffening ribs or honeycomb structures within the hollow space of the structures. The stiffening ribs may be machined into the inner surfaces of the multiple bonded segments that comprise the structure, or the honeycomb may be inserted into the hollow space prior to bonding the multiple segments together.

An alternate approach for internally stiffening hollow components, such as fan blades, compressor blades and vanes, includes bonding a layer of high modulus metal matrix composite onto the inner surfaces of the structural segments comprising the component. The layer may comprise one or more piles of ceramic fibers and alloy matrix which form a stiffening layer of metal matrix composite on the inner surfaces of the structure. The metal matrix composite may be applied by methods such as vacuum hot pressing, hot isostatic pressing of alloys and fibers, or by plasma spray deposition of molten alloy powder over fiber mats. Such reinforced segments are then joined by conventional methods such as brazing, diffusion bonding or electron beam welding to form the desired structure.

Although the prior techniques of stiffening an airfoil are steps in the right direction, the need for additional improvement still remains. The present invention satisfies this need in a novel and unobvious way.

SUMMARY OF THE INVENTION

One form of the present invention contemplates an apparatus comprising a single-cast metallic airfoil structure having a high stiffness core positioned therein and coupled with the structure.

Another form of the present invention contemplates an airfoil, comprising: a high stiffness core member; and a cast metallic monolithic structure having the high stiffness core member positioned within and fixedly coupled thereto, wherein the airfoil has a modulus of elasticity greater than the modulus of elasticity of the cast metallic monolithic structure.

In yet another form of the present invention there is contemplated an apparatus, comprising: a stiffening core formed of a material selected from a group consisting of metal matrix composites and gamma titanium aluminide; and, a cast metallic structure having an outer surface defining an airfoil, the cast metallic structure formed around and connected to the stiffening core, wherein the cast structure substantially encloses stiffening core.

One aspect of the present invention contemplates a method for fabricating an airfoil, comprising: providing a high stiffness member and a casting mold having a cavity adapted for forming an airfoil shaped structure therein; positioning the high stiffness member within the cavity; casting a metal structure around the high stiffness member after the positioning; and forming a metallurgical bond between the metal structure and the high stiffness member after the casting.

One object of the present invention is to provide an improved cast metallic airfoil having a high stiffness core positioned therein.

Related objects and advantages of the present invention will be apparent from the following description.

DESCRIPTION OF THE PREFERRED EMBODIMENTS

Figure 1:
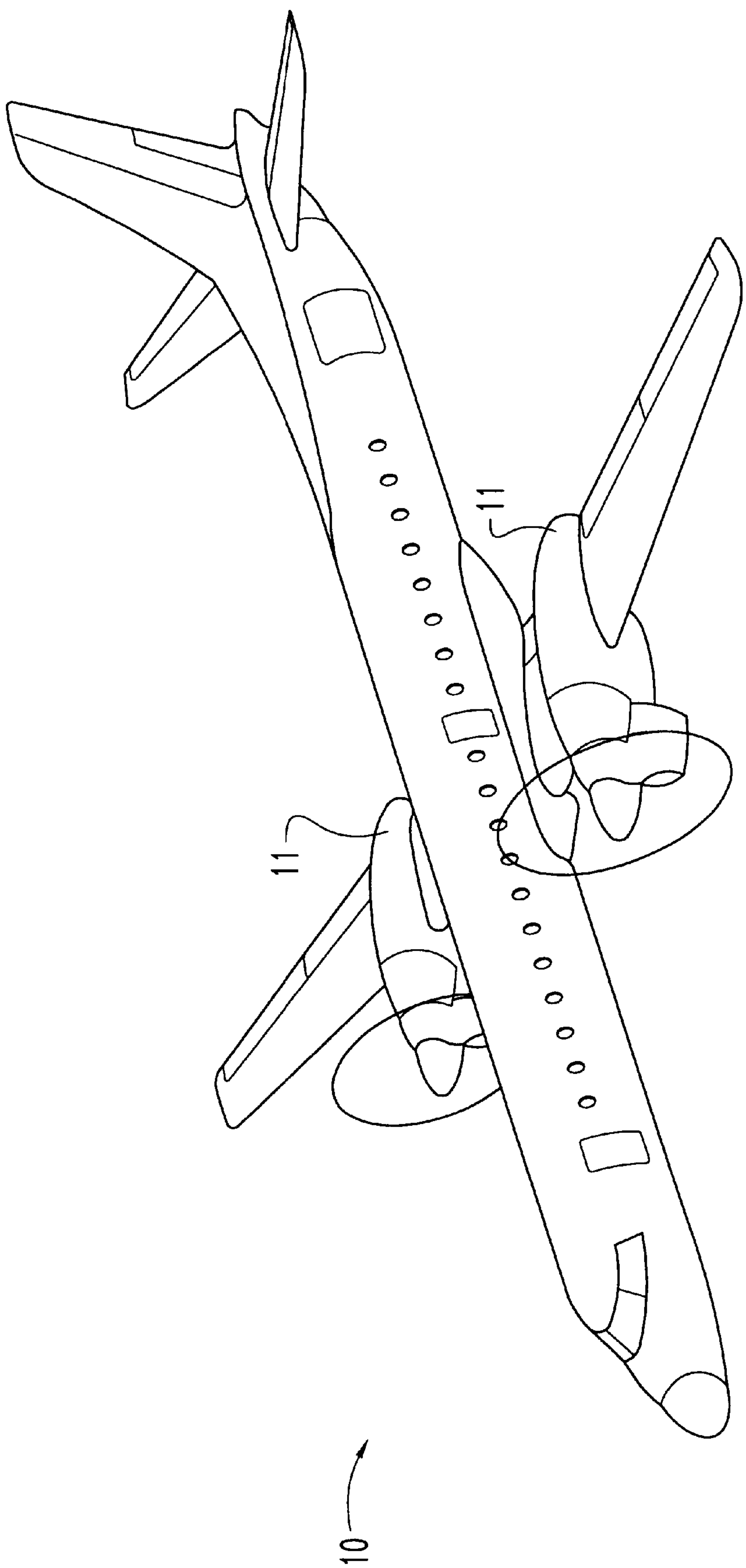
FIG. 1 is a perspective view of an aircraft having one embodiment of a gas turbine engine coupled thereto.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
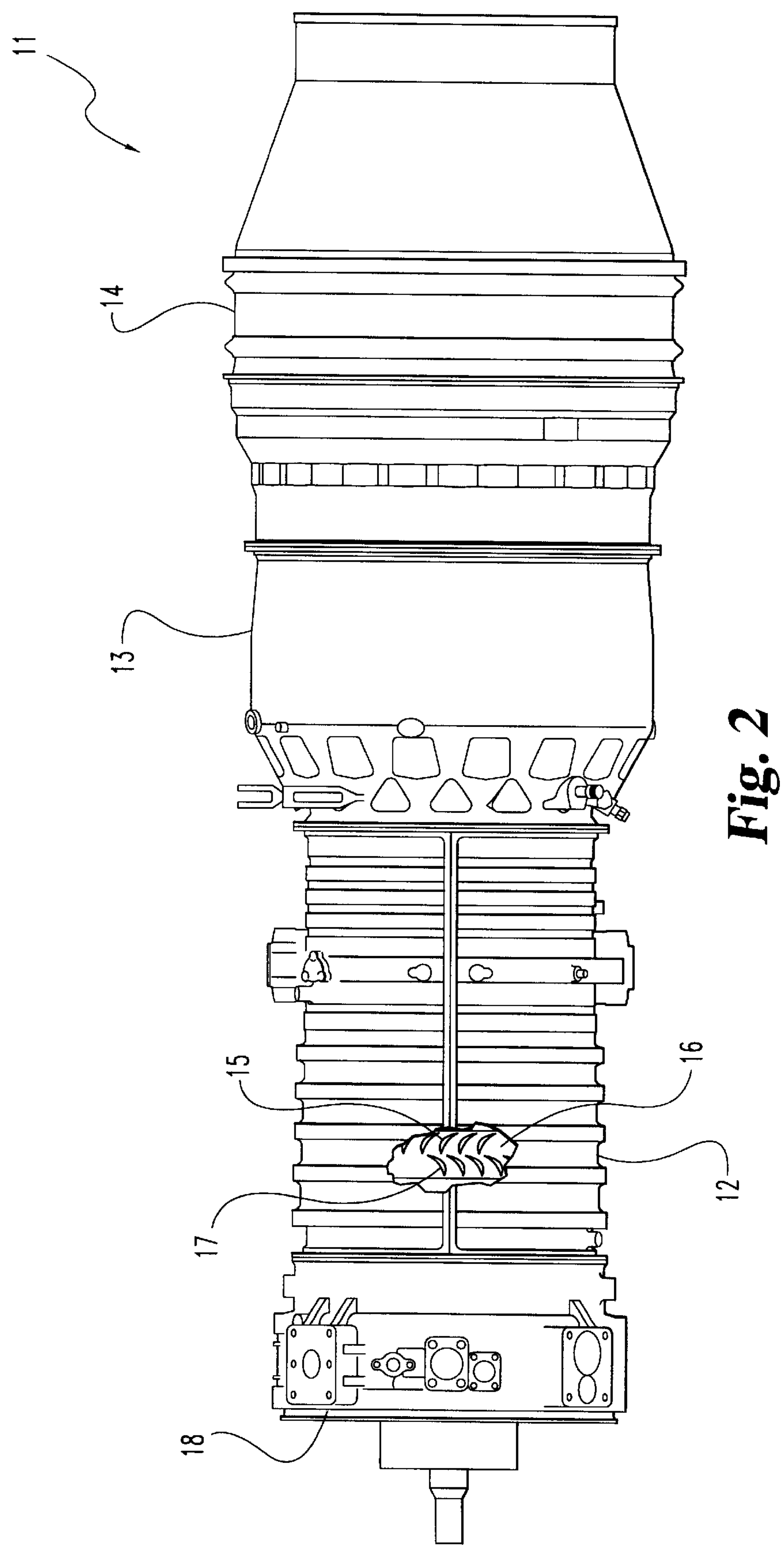
FIG. 2 is a partially fragmented enlarged side elevational view of the gas turbine engine of FIG. 1.

With reference to FIGS. 1 and 2, there is illustrated an aircraft 10 having an aircraft flight propulsion engine 11. The term aircraft is generic and includes helicopters, airplanes, missiles, unmanned space devices and other related apparatuses. One embodiment of the flight propulsion 11 defines a gas turbine engine integrating a compressor 12, a combustor 13 and a power turbine 14. It is important to realize that there are a multitude of ways in which the gas turbine engine components can be linked together. Additional compressors and turbines can be added with the intercoolers connecting between the compressors and reheat combustion chambers could be added between the turbines.

Further, the gas turbine engine is equally suited to be used for an industrial application. Historically, there has been widespread application of industrial gas turbine engines such as pumping sets for gas and oil transmission lines, electricity generation and shipboard propulsion. A plurality of compressor blades 15 are coupled to a rotor disk 17 that is affixed to a shaft rotatable within the gas turbine engine 11. It is understood herein that the compressor may contain, but is not limited to, between one and fifteen stages. The forward stages of the compressor will be located closest to the forward end 18 of the gas turbine engine 11. Further, the plurality of vanes 17 may be conventionally joined together to collectively form a complete 360° nozzle. It is understood herein that gas turbine engine blades and vanes are often referred to as airfoils and hereinafter this application will refer to blades and/or vanes as airfoils unless specifically stated otherwise in the text. Other products utilizing the present invention are contemplated herein including but not limited to fan blades and vanes, and any aerodynamic surface such as a missile fin.

Figure 3:
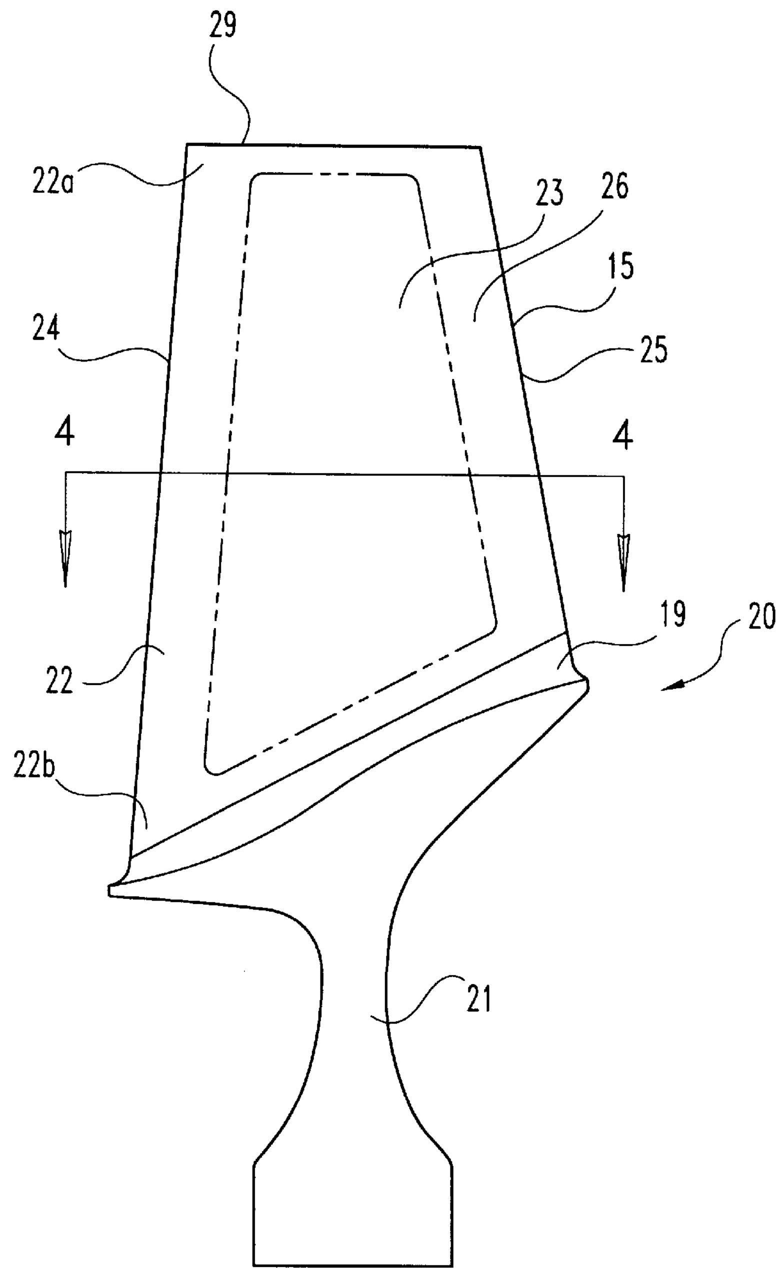
FIG. 3 is an illustrative view of an integrally bladed rotor disk comprising one embodiment of the present invention.

With reference to FIG. 3, there is disclosed one embodiment of an integrally bladed rotor disk 20 including a plurality of airfoils 22 extending radially therefrom. The integrally bladed rotor disk 20 is rotatable within engine 11 and has a wheel/disk portion 21 that is symmetrical about a centerline X. Each of the plurality of airfoils 22 are metallurgically connected at an attachment end 22*b* to an outer wheel/disk peripheral location 19 by diffusion bonding, fusion welding, linear friction welding, forge bonding or brazing. Further, the present invention is applicable to a blisk design wherein the airfoils are integrally bonded to a ring that is coupled to a disk. U.S. Pat. No. 4,270,256 to Ewing discloses a blisk design and is incorporated herein by reference.

Figure 4:
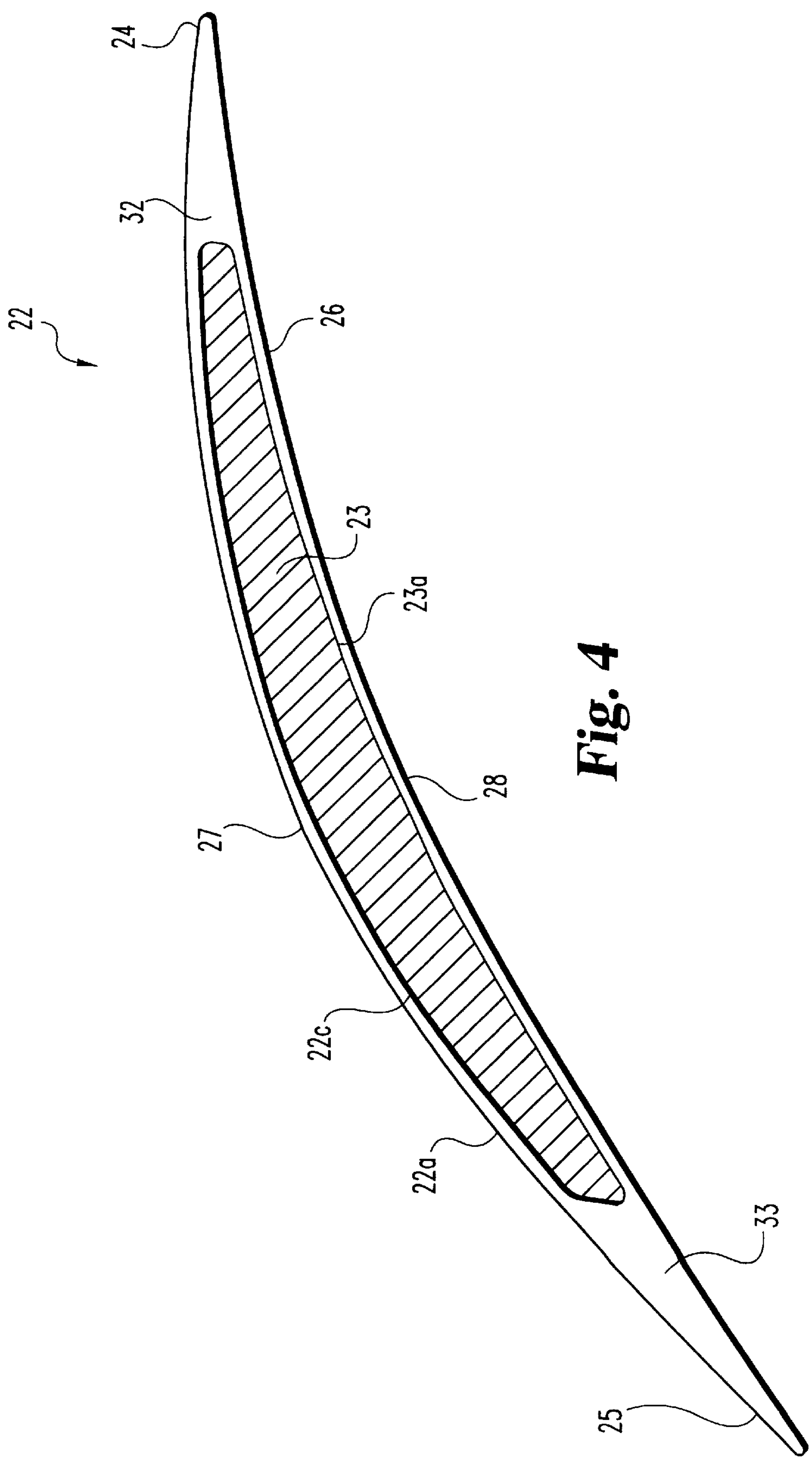
FIG. 4 is a sectional view taken along lines 4—4 of FIG. 3.

Each of the plurality of airfoils 22 includes a leading edge 24, a trailing edge 25, and an outer surface 26 extending therebetween. With reference to FIG. 4, there is illustrated a sectional view of the FIG. 3 airfoil 22. More specifically, outer surface 26 comprising a concave pressure side surface 28 and an opposite convex suction side surface 27. The term spanwise will be utilized herein to indicate a orientation between a tip 29 and the attachment end 22*b*; and the term streamwise will indicate an orientation between the leading edge 24 and the trailing edge 25. The leading edge 24 faces an upstream direction with respect to the approaching fluid flow and the trailing edge 25 faces in a downstream direction.

The plurality of airfoils 22 each contains a high stiffness core 23 therein that is surrounded by and coupled to a cast metallic structure 22*a* defining the airfoil 22. The cast monolithic metallic structure 22*a* covers and encapsulates the high stiffness core 23, and a portion of the cast cover is affixed to the wheel/disk portion 21 by a diffusion bond or welded joint. In one embodiment the high stiffness core 23 extending almost the entire length between the tip 29 and the attachment end 22*b*. More preferably, the core 23 is located within and fixedly connected to the metallic structure 22*a* and extends from adjacent the leading edge 24 to adjacent the trailing edge 25, and from adjacent the tip 29 to adjacent the attachment end 22*b*. In a preferred form the airfoil 22 defines a single-cast metallic structure 22*a* that is internally reinforced by a high stiffness core that is metallurgically bonded along its outer surface to the structure 22*a*. Further, in one embodiment the high stiffness core 23 occupied a substantial portion of the volume defined by the airfoil structure 22*a*.

A preferred form of the cast metallic structure 22*a* has an integral leading edge portion 32 and an integral trailing edge portion 33 that are designed to withstand bird strikes, and foreign/domestic object damage. In one embodiment, the cast metallic structure 22*a* is formed of a metallic alloy, and in a more preferred form the structure 22*a* is formed of a titanium alloy. The titanium alloy includes, but is not limited to Ti—6Al—4V or Ti—6Al—2Sn—4Zr—2Mo. A person skilled in the art will recognize that the room temperature modulus of elasticity for these types of conventional titanium alloys is about $17\times10^6$ pounds per square inch (psi).

The core 23 is formed of a material and/or material system having enhanced stiffness properties relative to the cast monolithic metallic structure 22*a*. More specifically, the core 23 has a modulus of elasticity greater than the modulus of elasticity of the cast metallic structure 22*a*. The core 23 is preferably formed of a material selected from a group consisting of consolidated metal matrix composites and gamma titanium aluminide. More specifically, in a preferred embodiment the metal matrix composites define a titanium based metal matrix composite and the gamma titanium aluminide defines a material such as Ti—45Al—5Nb—1W (atomic percent). Metal matrix composites are well known in the art and include a plurality of reinforcing fibers and a metallic matrix material. A person skilled in the art will recognize that the room temperature modulus of elasticity for gamma titanium aluminide is on the order of $24\times10^6$ pounds per.square inch (psi). In one preferred embodiment the room temperature longitudinal modulus of elasticity for a titanium metal matrix composite consisting of a Ti—6Al—4V matrix and SCS-6 silicon carbide fibers is on the order of $32\times10^6$ pounds per square inch (psi) with a fiber loading of 40 percent by volume. Further, other metal matrix composite systems are contemplated herein.

In one embodiment the high stiffness core 23 is a solid structure with an outer surface 23*a* that abuts an inner surface 22*c* of the cast metallic airfoil structure. Preferably, the high stiffness core is substantially airfoil shaped. However, in alternate embodiments the high stiffness core is not airfoil shaped and the disclosure is not intended herein to be limited to a substantially airfoil shaped high stiffness core. The high stiffness core has a density less than the density of the cast metallic structure 22*a*, thereby reducing the weight and centrifugal loading of the component.

The high stiffness core 23 can be formed of gamma titanium aluminide in the following forms; powder metal, cast, or wrought alloy forms of this material. Further, the gamma titanium aluminide alloy core in the powder metal and cast form can be subjected to a wrought processing step prior to having the metallic structure cast therearound. A wrought processing operation includes, but is not limited herein to extruding, forging, rolling, and isothermal forging. Therefore, the gamma titanium high stiffness core 23 can be: a powder metal alloy form; a powder metal alloy form that has been processed by a wrought processing operation; a cast alloy form; or a cast alloy form that has been processing by a wrought processing operation.

Figure 5:
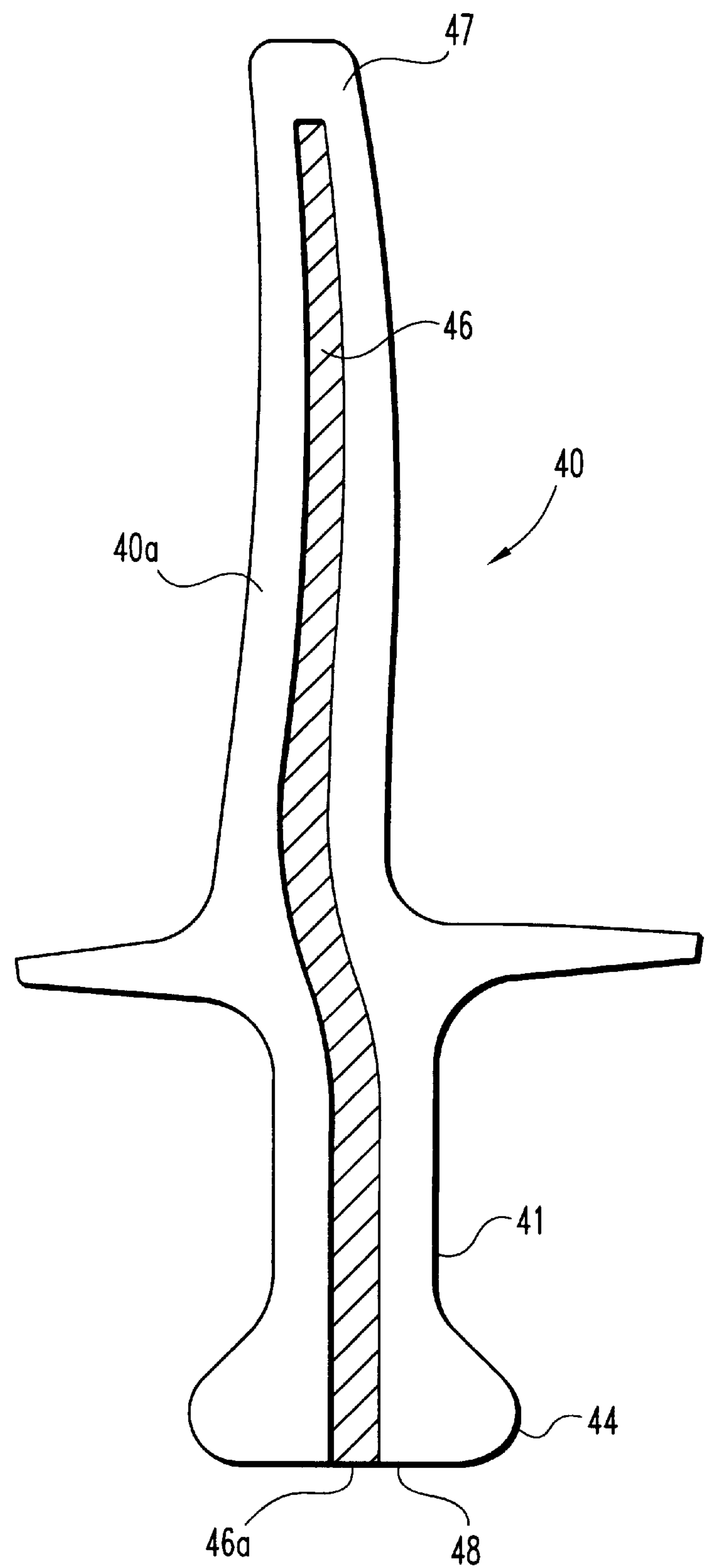
FIG. 5 is an illustrative view of an alternative embodiment of the present invention with a dove tail attachment.
Figure 6:
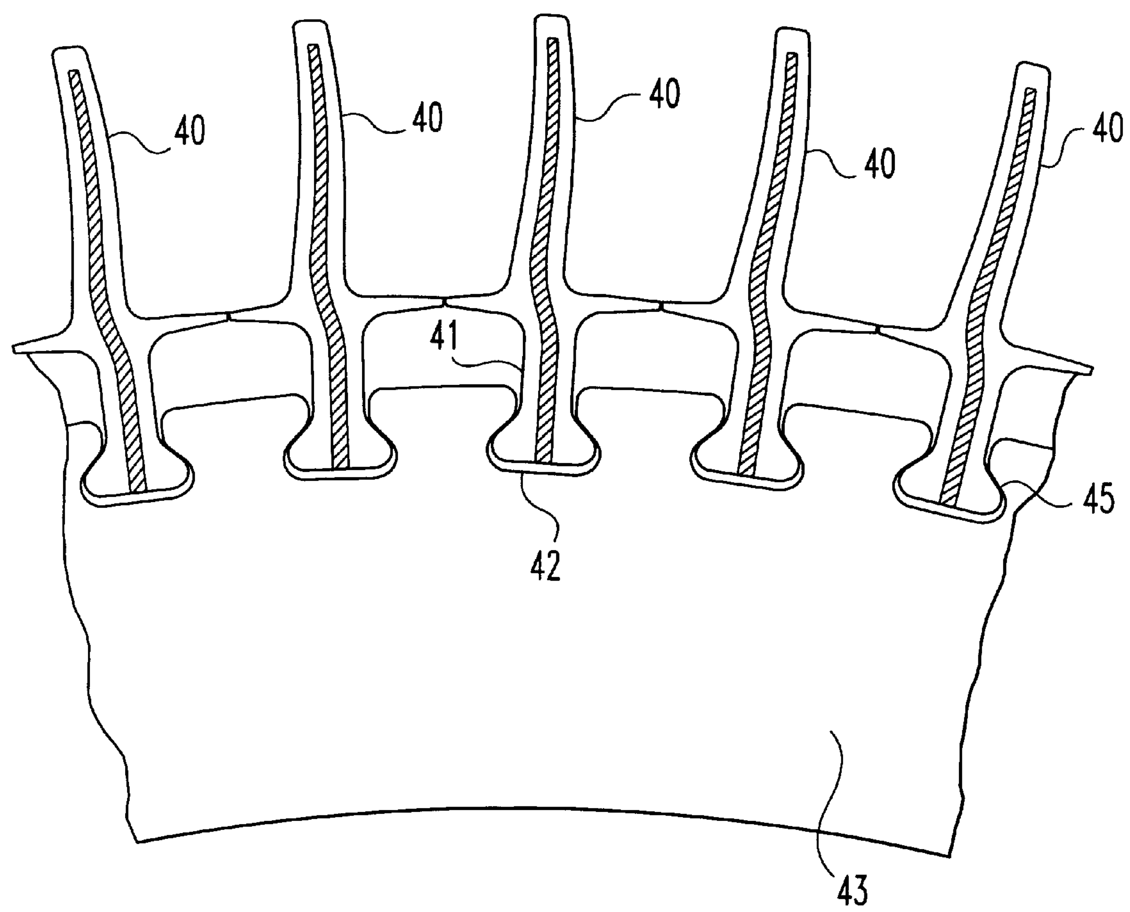
FIG. 6 is an illustrative view of the FIG. 5 airfoil coupled to a rotor disk.

With reference to FIGS. 5 and 6, there is illustrated a sectional view of an airfoil 40 comprising an alternative embodiment of the present invention. The airfoil 40 is substantially similar to airfoil 22 with the major distinctions being that airfoil 40 is not integrally connected to a rotor disk and includes an internally reinforced attachment portion 41. The attachment portion 41 is receivable within a corresponding attachment receiving portion 42 of a rotor disk 43. The integral attachment portion 41 includes a protuberance 44 that mates with a correspondingly shaped surface 45 defined in the attachment receiving portion 42. The attachment portion 41 is known to a person of ordinary skill in the art and includes, but is not limited to, a dovetail, a firtree, and a pinned root.

A high stiffness core 46 defines an integral member located within and connected to the metallic structure 40a defining the airfoil 40. The high stiffness core 46 is substantially similar to the high stiffness core 23 with the major exception that it extends into and stiffens the attachment portion 41. The core 46 extending from adjacent the leading edge 24 to adjacent the trailing edge 25, and from adjacent the tip 47 to the base 48 of the airfoil 40. The high stiffness core 46 increases the stiffness of the airfoil 40 and further provides improved bending stiffness in the blade neck area of the attachment portion 41. In one embodiment the single-cast metallic structure 40a encapsulates the high stiffness core with the exception that the portion 46a of the core 46 adjacent the base 48 is not encapsulated. In an alternate embodiment the portion of the core adjacent the base is encapsulated.

Figure 7:
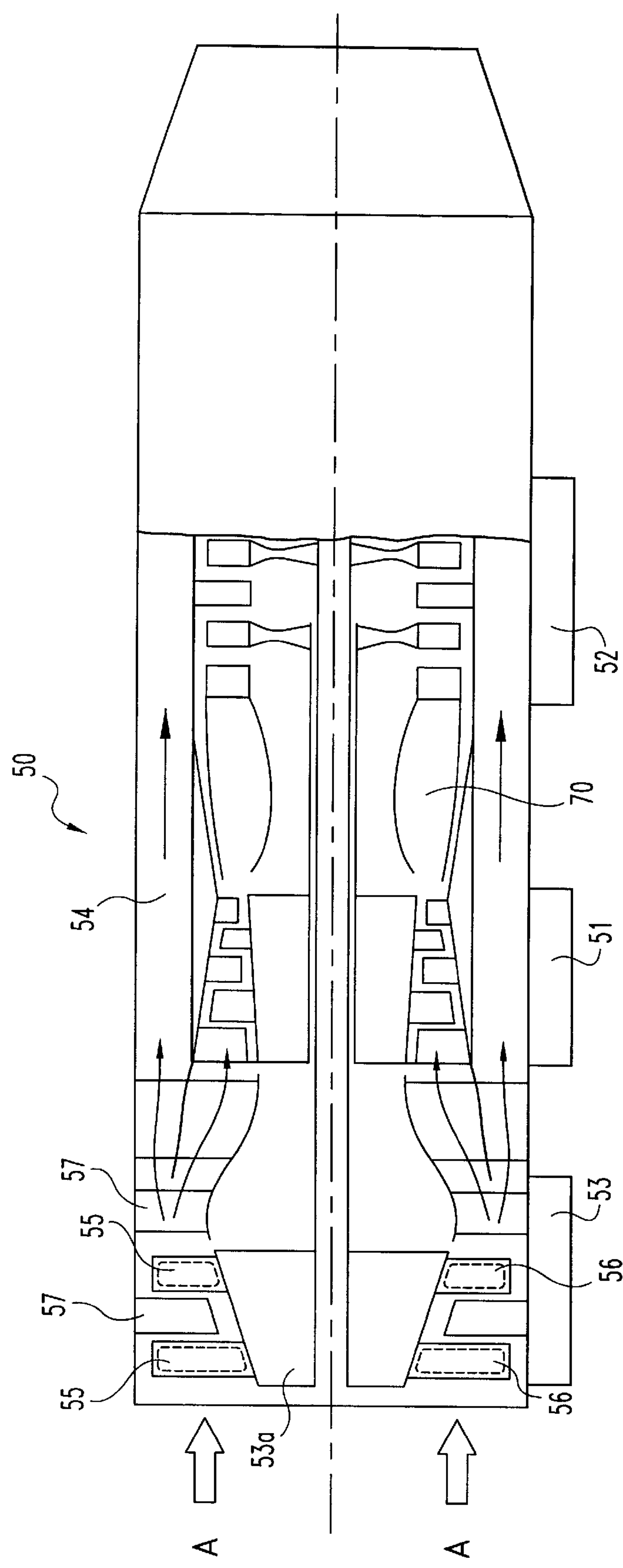
FIG. 7 is an illustrative view of an alternative embodiment of a gas turbine engine comprising an alternate embodiment of the present invention.

With reference to FIG. 7, there is illustrated a schematic of a gas turbine engine 50 which includes a compressor section 51, a turbine section 52, a combustor section 70, and a fan section 53. Air flows into the gas turbine engine 50 in the direction of arrows A and passes through the fan section 53 into the compressor section 51 and a bypass duct 54. Fan section 53 includes a fan 53a having a plurality of fan blades 55. The fan blades 55 each includes a high stiffness internal reinforcing core 56 positioned within the cast metallic airfoil. A plurality of fan vanes 57 is disposed within the flow path. While the fan blades are of different shape and size than the above discussed airfoils they are substantially similar in that they have a high stiffness core formed within a cast metallic structure, and more preferably are metallurgically bonded to the cast structure.

Figure 8:
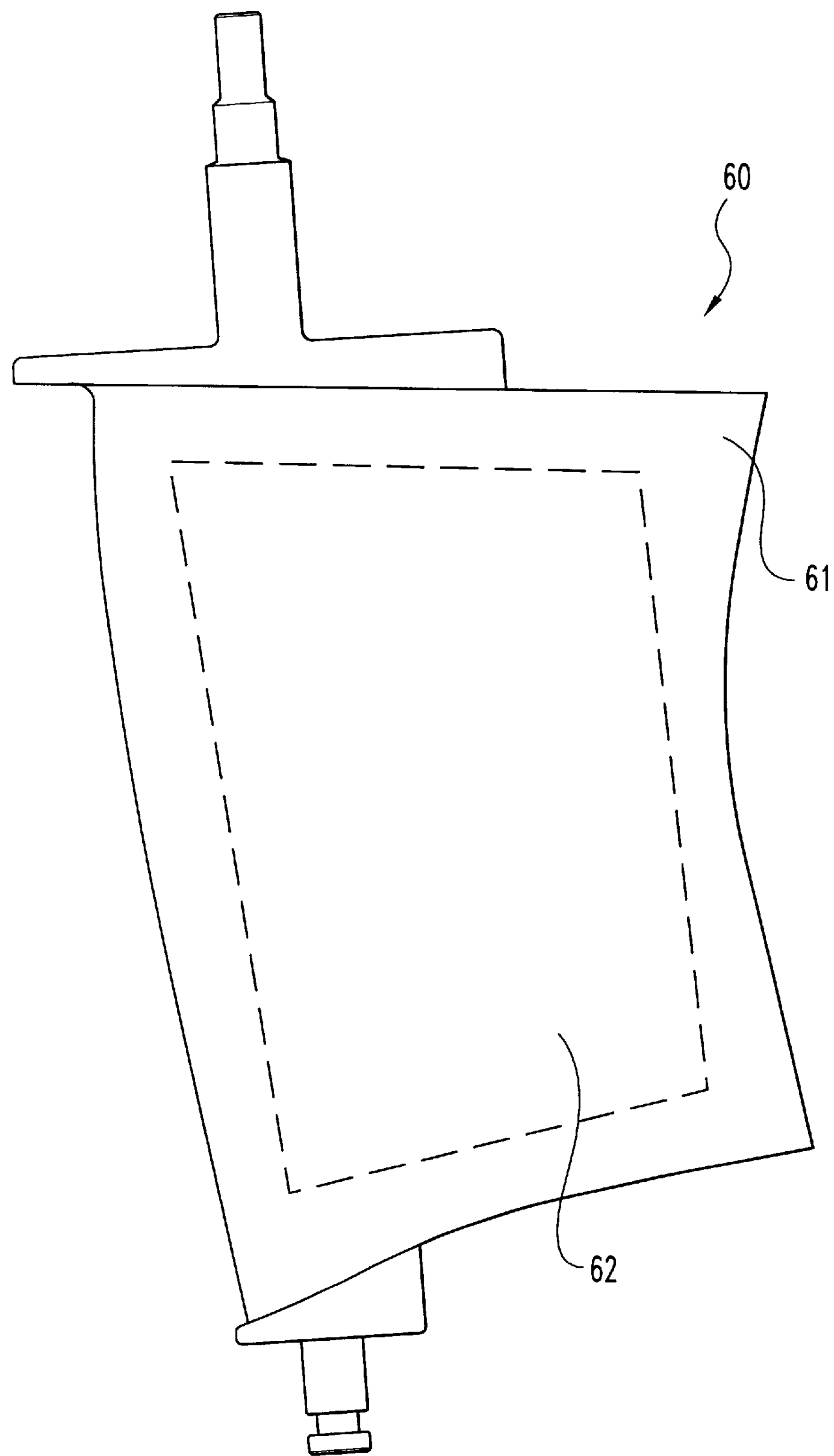
FIG. 8 is an illustrative view of a vane comprising one embodiment of the present invention.
Figure 9:
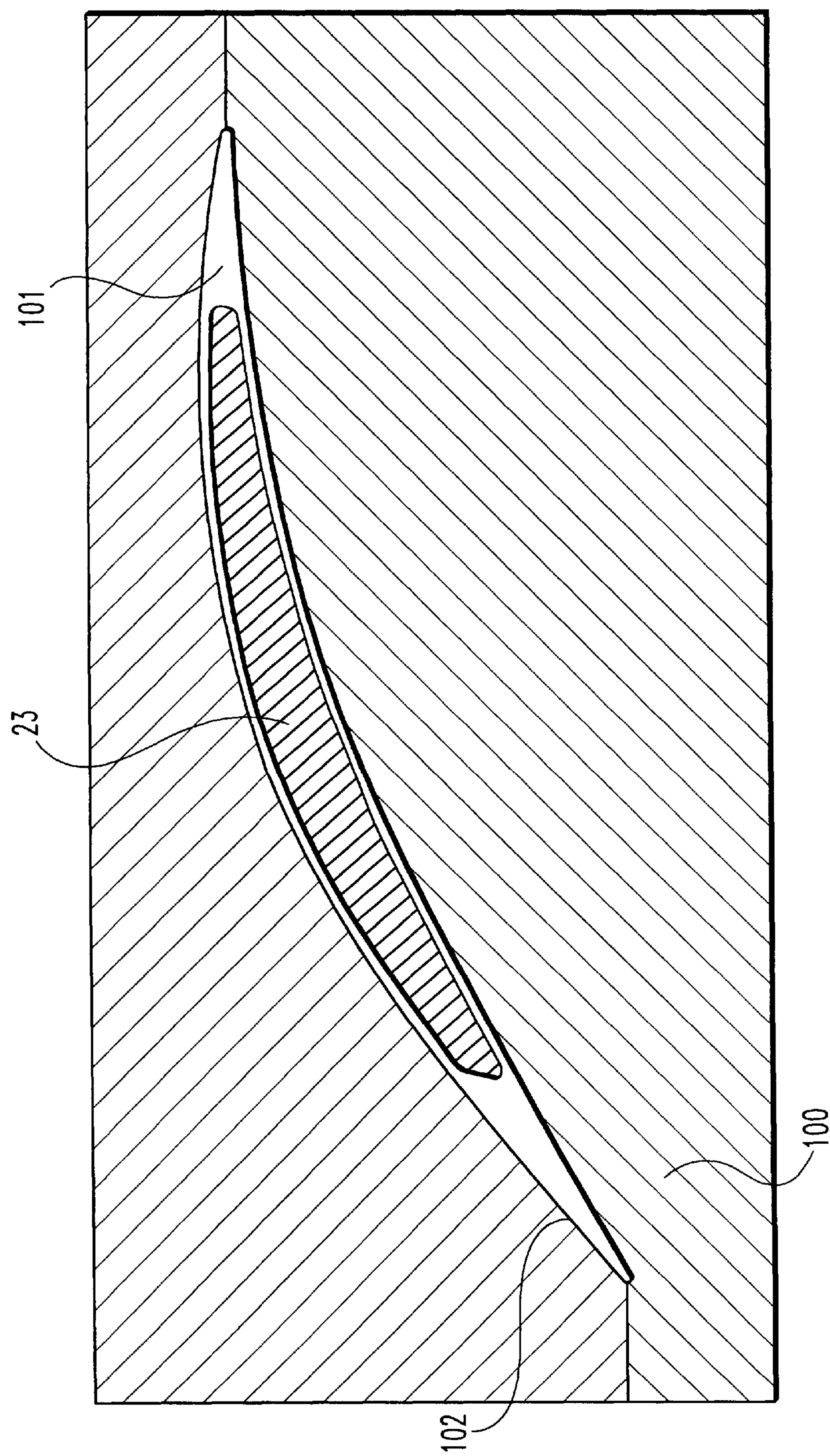
FIG. 9 is a schematic view of an airfoil of the present invention within a casting mold.

With reference to FIG. 8, there is illustrated a vane 60. The illustrated vane 60 is not intended to be limiting herein and all vane types including cantilever, inlet guide vanes, interstage vanes, variable geometry vanes, fixed geometry vanes, and exit guide vanes are contemplated herein. Vane 60 includes a cast metallic airfoil structure portion 61 having a high stiffness core 62 positioned therein. The high stiffness core 62 and the cast metallic vane structure 61 are substantially similar to the airfoils described above in this document.

A method to produce a high stiffness airfoil of the present invention will now be described with assistance of FIGS. 1–9. A preferred technique for producing the airfoil 22 includes positioning a high stiffness core 23 within a mold 100 and casting a conventional alloy 101 around the core. Candidate techniques for the casting of the airfoil include permanent mold casting, die casting and investment casting. The selection of which casting techniques to utilize depends upon design specific parameters, such as shape requirements.

A method of manufacturing a gamma titanium aluminide high stiffness core utilizes permanent mold casting or die casting techniques. In alternate embodiments the core is fabricated by a combination of machining, forging, casting, and powder metallurgy techniques. Further, the metal matrix composite cores would be fabricated utilizing a technique such as the foil-fiber-foil approach. Thereafter the gamma titanium aluminide or metal matrix composite core would be consolidated and fixtured in an airfoil shaped cavity 102 within mold 100 for receiving the molten alloy. The core positioning techniques employed would be similar to those routinely used for the insertion of ceramic cores in hollow turbine airfoils and structural components. In the present invention, however, the stiffening core would not be removed from the structure. The molten metal is then poured into the airfoil shaped cavity 102 to form a cast metallic structure coupled to and substantially surrounding the core. After pouring, the high stiffness core becomes an integral, permanent portion of the high stiffness airfoil. In one embodiment the single-cast metallic airfoil with the internal core is subjected to a hot isostatic pressing (HIP) operation. The HIP operation will result in complete densification of the cast alloy structure and insure that a full metallurgical bond occurred between the core and the metal structure.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising a single-cast metallic airfoil structure having a high stiffness metallic core positioned therein and coupled with said structure.

2. The apparatus of claim 1, wherein the airfoil structure has a tip end and an opposite attachment end with a length therebetween, and wherein said high stiffness metallic core extending almost the entire distance of said length.

3. The apparatus of claim 2, wherein the airfoil structure has a leading edge and a trailing edge with an outer surface extending from said leading edge to said trailing edge and from said tip end to said attachment end, and wherein said high stiffness metallic core extending from about said leading edge to about said trailing edge.

4. The apparatus of claim 3, wherein said metallic core is solid.

5. The apparatus of claim 3, wherein the airfoil structure defining a cast cover encapsulating said high stiffness metallic core from said leading edge to said trailing edge and from said tip end to near said attachment end.

6. The apparatus of claim 5, wherein said high stiffness metallic core has a substantially airfoil shaped portion spaced from said outer surface.

7. The apparatus of claim 5, wherein said high stiffness metallic core has an outer surface that abuts and is metallurgically bonded to said cast metallic airfoil structure.

8. The apparatus of claim 7, wherein said high stiffness metallic core is a consolidated metal matrix composite.

9. The apparatus of claim 7, wherein said high stiffness metallic core is formed of gamma titanium aluminide.

10. The apparatus of claim 1, wherein:

said airfoil structure has a first outer surface extending between a tip end and an opposite attachment end and further extending between a leading edge and a trailing edge;

said airfoil structure defining a cast cover encapsulating said high stiffness metallic core from said leading edge to said trailing edge and from said tip end to near said attachment end;

said high stiffness metallic core has a substantially airfoil shaped portion spaced from said first outer surface, and wherein said high stiffness core has a second outer surface that abuts and is metallurgically bonded to said cast metallic airfoil structure; and wherein said high stiffness metallic core is formed of a material selected from a group consisting of consolidated metal matrix composites and gamma titanium aluminide.

11. The apparatus of claim 2, which further includes a disk, and wherein the apparatus is coupled to said disk.

12. The apparatus of claim 11, wherein said airfoil structure defining a cast cover encapsulating said high stiffness metallic core, and wherein a portion of said cast cover is coupled to an outer periphery of said disk by a diffusion bond.

13. The apparatus of claim 11, wherein said airfoil structure defining a cast cover encapsulating said high stiffness metallic core, and wherein a portion of said cast cover is coupled to an outer periphery of said disk by a braze bond.

14. The apparatus of claim 11, wherein said airfoil structure defining a cast cover encapsulating said high stiffness metallic core, and wherein a portion of said cast cover is coupled to an outer periphery of said disk by linear friction welding.

15. The apparatus of claim 11, wherein said airfoil structure defining a cast cover encapsulating said high stiffness metallic core, and wherein a portion of said cast cover is coupled to an outer periphery of said disk by forge bonding.

16. The apparatus of claim 11, wherein said airfoil structure defining a cast cover encapsulating said high stiffness metallic core, and wherein a portion of said cast cover is coupled to an outer periphery of said disk by fusion welding.

17. The apparatus of claim 11, wherein said apparatus further includes an attachment portion, and wherein said disk includes an attachment receiving portion for receiving the attachment portion therein.

18. An airfoil, comprising:

a high stiffness metallic core member; and a cast metallic monolithic structure having said high stiffness core member positioned within and fixedly coupled thereto, wherein the high stiffness metallic core member has a modulus of elasticity greater than the modulus of elasticity of the cast metallic monolithic structure and wherein the airfoil has a modulus of elasticity greater than the modulus of elasticity of said cast metallic monolithic structure.

19. The airfoil of claim 18, wherein said high stiffness metallic core has a room temperature modulus of elasticity on the order of $24\times10^6$ pounds per square inch, and wherein the cast metallic structure has a room temperature modulus of elasticity on the order of $17\times10^6$ pounds per square inch.

20. The airfoil of claim 19, wherein said cast metallic monolithic structure is formed of a titanium alloy, and wherein said high stiffness core member is formed of gamma titanium aluminide.

21. The airfoil of claim 20, wherein said high stiffness metallic core member is solid.

22. The airfoil of claim 21, wherein said high stiffness metallic core member has a portion with a first substantially airfoil shape.

23. The airfoil of claim 22, wherein said cast metallic monolithic structure is metallurgically bonded to an outer surface of said high stiffness metallic core member.

24. The airfoil of claim 23, wherein said cast metallic monolithic structure has a portion with a second substantially airfoil shape, and wherein said high stiffness metallic core member occupies a substantial portion within the volume defined by said portion with a second substantially airfoil shape.

25. The airfoil of claim 24, wherein the airfoil defines a gas turbine engine blade.

26. The airfoil of claim 24, wherein the airfoil defines a gas turbine engine vane.

27. The airfoil of claim 18, wherein said high stiffness metallic core has a room temperature longitudinal modulus of elasticity on the order of $32\times10^6$ pounds per square inch, and wherein the cast metallic monolithic structure has a room temperature modulus of elasticity on the order of $17\times10^6$ pounds per square inch.

28. The airfoil of claim 27, wherein said cast metallic monolithic structure is formed of a titanium alloy, and wherein said high stiffness metallic core member is formed of a titanium metal matrix composite.

29. The airfoil of claim 28, wherein said core member is solid and has a portion with a first substantially airfoil shape, and wherein said cast metallic monolithic structure is metallurgically bonded to an outer surface of said high stiffness metallic core member.

30. The airfoil of claim 29, wherein said cast metallic monolithic structure has a portion with a second substantially airfoil shape, and wherein said high stiffness metallic core member occupying a substantial portion within the volume defined by said portion with a second substantially airfoil shape.

31. The airfoil of claim 30, wherein said titanium metal matrix composite includes a plurality of silicon carbide fibers, and wherein said high stiffness metallic core has a fiber loading of forty percent by volume.

32. An apparatus, comprising:

a stiffening core formed of a material selected from a group consisting of metal matrix composites and gamma titanium aluminide; and a cast metallic structure having an outer surface defining an airfoil, said cast metallic structure formed around and connected to said stiffening core, wherein said cast structure substantially encloses said first stiffening core.

33. The apparatus of claim 32, wherein said metal matrix composite defines a titanium metal matrix composite.

34. The apparatus of claim 32, wherein said cast structure is a single cast structure.

35. The apparatus of claim 34, wherein said cast metallic structure is metallurgically bonded to said stiffening core.

36. The apparatus of claim 35, wherein the stiffening core has a density less than the density of said cast metallic structure so that the apparatus has a density less than the density of said cast metallic structure.

37. A method for fabricating an airfoil, comprising:

providing a high stiffness member and a casting mold having a cavity adapted for forming an airfoil shaped structure therein;

positioning the high stiffness member within the cavity;

casting a metal structure around the high stiffness member after said positioning; and forming a metallurgical bond between the metal structure and the high stiffness member after said casting.

38. The method of claim 37, wherein said forming includes hot isostatic pressing to densify the airfoil.

39. The method of claim 38, which further comprises forming the high stiffness member into a substantially airfoil shape prior to said positioning.

40. The method of claim 39, wherein said providing of the high stiffness member is accomplished by one of permanent mold casting or die casting.

41. The method of claim 39, wherein said providing of the high stiffness member is accomplished by powder metallurgy manufacturing techniques.

42. The method of claim 39, wherein said providing of the high stiffness member is accomplished by titanium metal matrix manufacturing techniques.

* * * * *